May 16, 1944.　　A. W. N. JOHNSON　　2,348,819
EXPANSIBLE CHUCK
Filed Dec. 14, 1942　　2 Sheets-Sheet 2
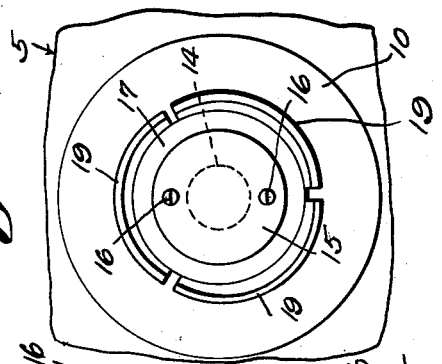
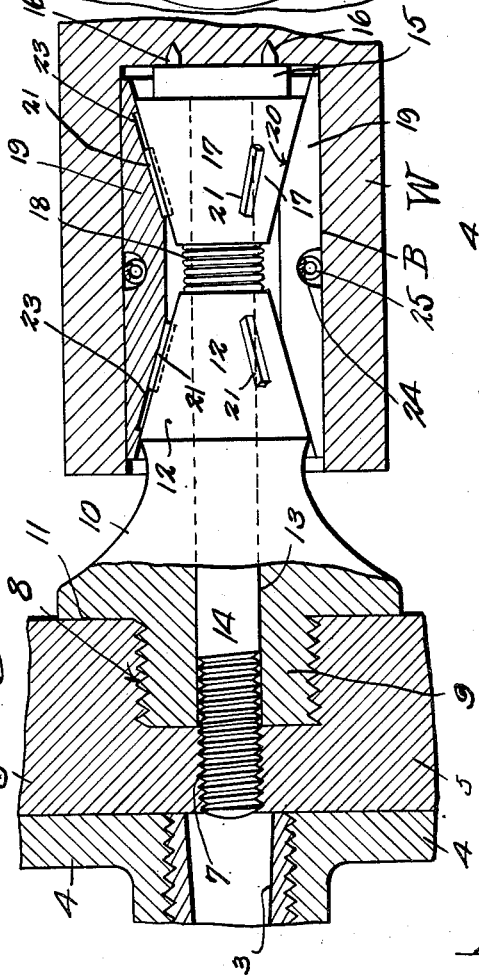
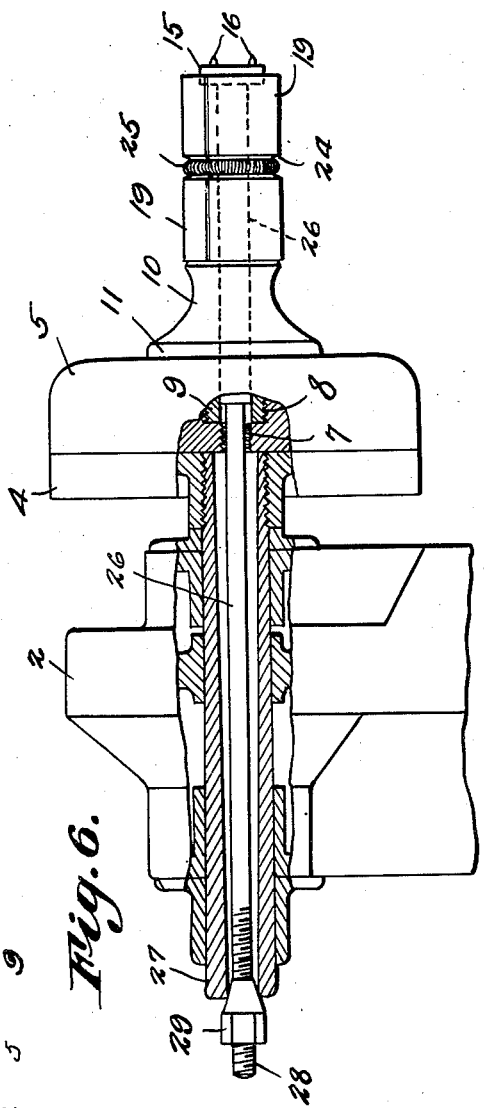
A. W. N. Johnson
INVENTOR.
BY Patented May 16, 1944

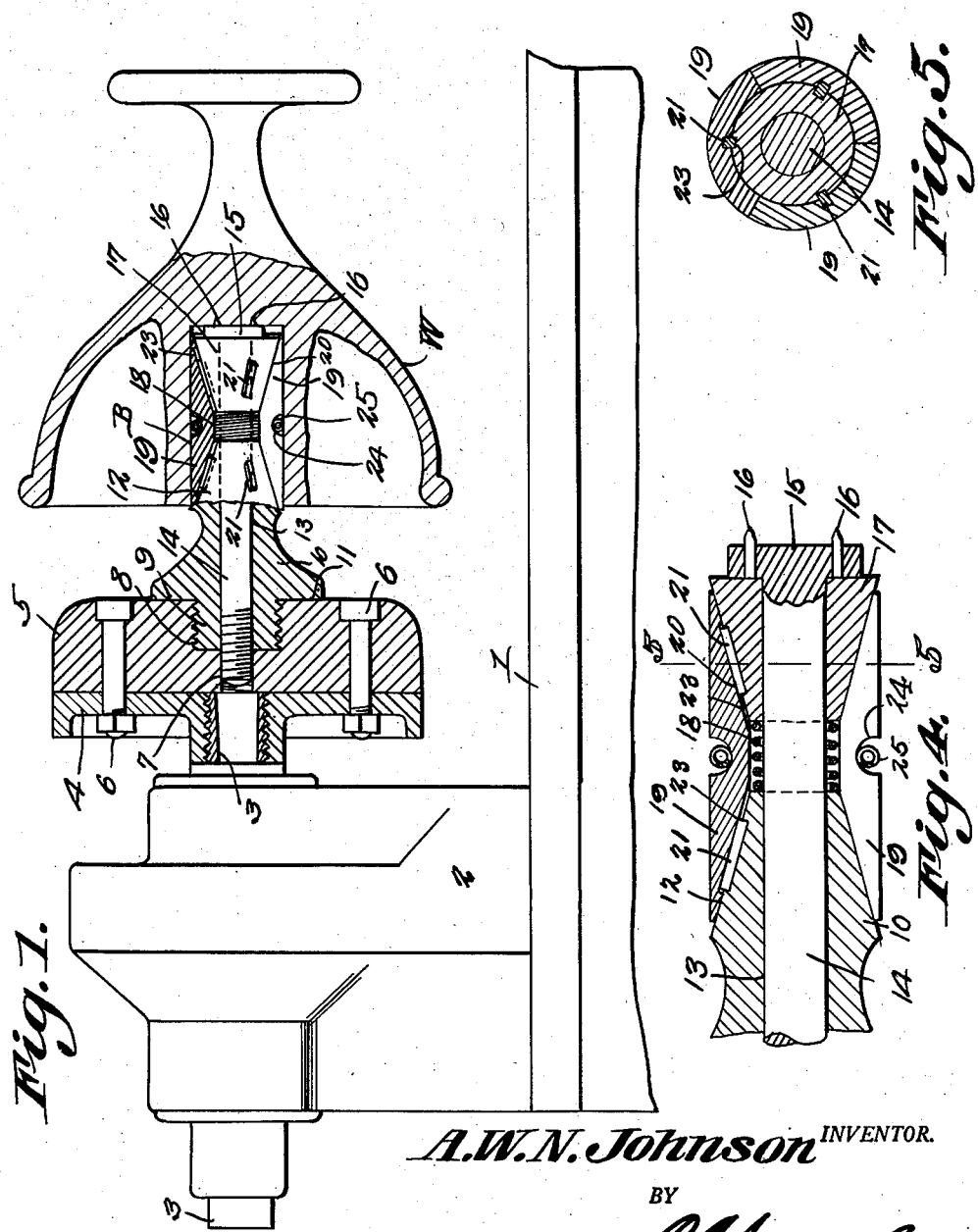

2,348,819

UNITED STATES PATENT OFFICE 2,348,819

EXPANSIBLE CHUCK

Arthur W. N. Johnson, Garberville, Calif.

Application December 14, 1942, Serial No. 468,978

3 Claims. (Cl. 279—2)

This invention relates to a chuck designed for use on lathes and adaptable for either wood-turning or metal-turning.

An object of the invention is to provide a device fo this character which can be attached readily to the face plate of a chuck and which can be readily expanded or contracted, as desired, within a bore formed in the work so that the work can be anchored firmly to the rotatable spindle carried by the head stock and can be just as easily disconnected therefrom.

A further object is to provide a chuck which is simple in construction, compact, easily applied, and operates efficiently to hold the work during the turning operation.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is a front elevation of the head stock and adjacent portion of a lathe, the present improvements, in engagement with an article being shaped, being shown in position and in section.

Figure 2 is an enlarged central longitudinal section through the chuck and adjacent parts, the cones of the chuck being shown in elevation.

Figure 3 is an end elevation of the chuck.

Figure 4 is a section through the split sleeve and the cone portions of the chuck taken in the direction of the length thereof the bolt head being also shown in section.

Figure 5 is a section on line 5—5, Figure 4.

Figure 6 is a view partly in section and partly in elevation showing the chuck held to the rotatable tubular spindle of the head stock by an elongated adjusting bolt whereby the chuck is adapted primarily for use in metal-turning.

Referring to the figures by characters of reference, I designates a portion of the bed of a lathe on which is mounted the usual head stock 2 having a rotatable spindle 3 to which is secured a face plate 4 such as commonly employed.

The present invention includes an attaching disk 5 adapted to be suitably secured to the face plate 4, as by means of bolts 6. This disk has a central opening 7 which is counterbored as at 8, the counterbore being screw-threaded for the reception of a screw-threaded stud 9 projecting from a stem 10 the base 11 of which is adapted to fit tightly against the adjacent surface of the disk 5. Stem 10 has a cone 12 at one end and is provided with a central longitudinal bore 13. This bore is adapted to receive an adjusting bolt or pin 14 one end of which is screwed into the opening 7 while the other end has a head 15 provided with projecting prongs 16 spaced from the axis of rotation of bolt 14. On bolt 14 is located a cone 17 disposed oppositely to the cone 12 and held spaced therefrom by a coiled spring 18 which is mounted on the bolt and serves to press the two cones apart.

An expanding sleeve made up of segmental sections 19 is extended around the two cones, the ends of the sleeve being flared as indicated at 20 so as to receive the cones. In order to hold these segmental sections against rotation relative to the cones, keys 21 are preferably carried by the cones 12 and 17 and fitted in corresponding grooves 23 formed in the inner surfaces of the sleeve segments. An annular groove 24 is provided in the sleeve at the center thereof and seated therein is a ring 25 in the form of a coiled spring, this ring serving to hold the segments of the sleeve normally contracted about the two cones.

In practice the pin or bolt 14 is unscrewed so as to permit the spring 18 to expand and move the cone 17 away from the cone 12. Thus the spring 25 will be permitted to contract and draw the sleeve segments 19 inwardly toward each other and thereby reduce the overall diameter of the chuck. When this diameter has been reduced so as to be less than the diameter of a bore B formed in the work W, the work is placed on the chuck with the cones and sleeve in the bore B. The inner end of the bore is brought into engagement with the prongs or spurs 16 as shown for example in Figs. 1 and 2. The work is then rotated and this will cause the bolt 14 to be revolved and the screw into the opening 7. Obviously this will result in the head 15 thrusting against cone 7 and placing spring 18 under compression. As cone 17 moves toward cone 12 the segmental sleeve 19 will be expanded against the action of spring 25 until said segmental sleeve is caused to bind firmly against the wall of the bore, thereby anchoring the work to the stem 10, disk 5 and face plate 4, with the result that the work, securely held and centered, can be rotated with the shaft or spindle in the head stock.

Should it be desired to release the work it is merely necessary to rotate it in the opposite direction from that in which it had previously been revolved relative to disk 5 and this will cause the bolt or pin 14 to unscrew and allow the chuck to contract and release the work therefrom.

The structure thus far described is especially useful for wood-turning. If the chuck is to be used for turning metal the structure could be modified as shown in Fig. 6. In the structure illustrated in that figure, the center pin or bolt instead of being screwed into the disk 5 as shown in Figs. 1 and 2, can be made elongated as indicated at 26 so as to extend entirely through the tubular shaft or spindle 27 so that the threaded end of this bolt or pin will project beyond the spindle as shown at 28 where it can be engaged by a nut 29. By turning this nut the bolt can be fed longitudinally for the purpose of expanding the chuck. By rotating the nut in the opposite direction, the bolt can be released or paid out so as to permit contraction of the chuck by its spring 25. The construction of the chuck in this modified form is the same as that heretofore described.

What is claimed is:

1. An expansible lathe chuck including a stem, means for connecting the stem to the rotatable spindle of a lathe, a cone at one end of the stem, a longitudinally adjustable pin extending through the cone and stem, a cone mounted on the pin and disposed oppositely to the first named cone, a compression spring interposed between the cones for holding them normally spaced apart, an expansible work-engaging sleeve mounted on the opposed cones, means for holding the sleeve normally contracted for insertion into a bore in work to be turned, and means operated by the rotation of the work in one direction relative to the inserted contracted sleeve for feeding the pin one direction, thereby to draw the cones toward each other and expand the sleeve into tight fitting engagement with the work thereon.

2. An expansible chuck for insertion into a bore in an article to be shaped on a lathe, said chuck including a pin, means for adjustably connecting the pin to the rotatable spindle of a lathe, opposed cones through which the pin extends, a compression spring interposed between the cones for holding them normally spaced apart, a sleeve extending around the cones and centered thereby, said sleeve comprising normally spaced segmentaly sections, means for holding the sleeve normally contracted on the cones for insertion into said bore, and means on the pin positioned for engagement with and rotation by the end wall of the bore in said article, said pin, when rotated, constituting means for drawing the cones closer together to expand the sleeve into tight fitting engagement with the wall of the bore.

3. An expansible chuck for lathes including a stem, means for mounting the stem for rotation with the face plate of a lathe, a cone on the stem, a second cone disposed oppositely to the cone on the stem, a spring interposed between the cones for holding them normally spaced apart, an expansible sleeve centered on the cones, said sleeve comprising normally spaced segmental sections, a spring extending around the sleeve for holding it normally contracted, and means for shifting the cones toward each other to expand the sleeve, said means including a bolt, a head at one end thereof, means on the head for receiving motion from work surrounding the lathe thereby to feed the bolt longitudinally and expand the sleeve against the surrounding portion of the work, and screw-threaded means for feeding the bolt longitudinally when rotated by the work.

ARTHUR W. N. JOHNSON.